(12) United States Patent
Yoon et al.

(10) Patent No.: US 7,831,822 B2
(45) Date of Patent: Nov. 9, 2010

(54) REAL-TIME STATEFUL PACKET INSPECTION METHOD AND APPARATUS

(75) Inventors: Seung Yong Yoon, Daejeon (KR); Jin Tae Oh, Daejeon (KR); Jong Soo Jang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1009 days.

(21) Appl. No.: 11/633,174

(22) Filed: Dec. 4, 2006

(65) Prior Publication Data

US 2007/0297410 A1 Dec. 27, 2007

(30) Foreign Application Priority Data

Jun. 23, 2006 (KR) ...................... 10-2006-0057011

(51) Int. Cl.
*H04L 9/00* (2006.01)
*H04L 9/32* (2006.01)
*G06F 11/00* (2006.01)
(52) U.S. Cl. ...................... 713/154; 713/151; 713/152; 713/153; 713/160; 713/161; 713/162; 726/27; 726/28; 726/29; 726/30
(58) Field of Classification Search .................. 713/154
See application file for complete search history.

(56) References Cited

U.S. PATENT DOCUMENTS 7,231,484 B2 * 6/2007 Berenyi et al. .............. 710/308
7,283,526 B2 * 10/2007 Davis ......................... 370/392

FOREIGN PATENT DOCUMENTS

KR 10-2004-008171 1/2004
WO WO 02-19700 3/2002

OTHER PUBLICATIONS

Li, X., et al., "Stateful Inspection Firewall Session Table Processing."

* cited by examiner

*Primary Examiner*—Longbit Chai
(74) *Attorney, Agent, or Firm*—Ladas & Parry LLP (57) ABSTRACT

A real-time stateful packet inspection method and apparatus is provided, which uses a session table processing method that can efficiently generate state information. In the apparatus, a session table stores session data of a packet received from an external network. A hash key generator hashes a parameter extracted from the received packet and generates a hash pointer of the session table corresponding to the packet. A session detection module searches the session table for a session corresponding to the received packet. A session management module performs management of the session table such as addition, deletion, and change of sessions of the session table. A packet inspection module generates state information corresponding to the received packet from both directionality information of the packet and entry header information of the packet stored in the session table and then inspects the packet based on the generated state information.

25 Claims, 8 Drawing Sheets

| 4-tuple Position-Change-flag | Current state | State information |
|---|---|---|
| Any value | 000 | Not established |
| Any value | 001 | SYN_RCVD (3-way handshaking) |
| Any value | 010 | SYNACK_RCVD (3-way handshaking) |
| Any value | 011 | Reserved (unused) |
| 0 | 100, 101 | Established, directionality client -> server |
| 1 | 100, 101 | Established, directionality server -> client |
| 1 | 110, 111 | Established, directionality client -> server |
| 0 | 110, 111 | Established, directionality server -> client |

| Current state | State information |
|---|---|
| 000 | Not established |
| 001 | SYN_RCVD (3-way handshaking) |
| 010 | SYNACK_RCVD (3-way handshaking) |
| 011 | Reserved (unused) |
| 100 | Established, positions not reversed, not half-closed |
| 101 | Established, positions not reversed, half-closed |
| 110 | Established, positions reversed, not half-closed |
| 111 | Established, positions reversed, half-closed |

| 4-tuple Position-Change-flag | Current state | State information |
|---|---|---|
| Any value | 000 | Not established |
| Any value | 001 | SYN_RCVD (3-way handshaking) |
| Any value | 010 | SYNACK_RCVD (3-way handshaking) |
| Any value | 011 | Reserved (unused) |
| 0 | 100, 101 | Established, directionality client -> server |
| 1 | 100, 101 | Established, directionality server -> client |
| 1 | 110, 111 | Established, directionality client -> server |
| 0 | 110, 111 | Established, directionality server -> client |

REAL-TIME STATEFUL PACKET INSPECTION METHOD AND APPARATUS

BACKGROUND OF THE INVENTION

1. Field of the Invention

The present invention relates to a method, and apparatus for performing stateful packet inspection in real time using a session table processing method that allows more efficient generation of state information.

2. Description of the Related Art

Stateful packet inspection used in network security fields is a technology that extends conventional inspection performed on a packet-by-packet basis and performs inspection and tracking in units of sessions or connections, each corresponding to a stream of packets. For example, stateful firewalls can efficiently block TCP ACK packets of each session having no preceding TCP SYN packets. This session or connection-based tracking and inspection has been applied not only to stateful firewalls but also to various other fields such as virtual private networks (VPN), traffic monitoring, traffic load balancing, accounting and charging, network intrusion detection systems (NIDS), and network intrusion prevention systems (NIPS).

However, the rapid evolution of recent network technologies to Giga network environments require existing stateful packet inspection equipment to have more improved functions and performance. Stateful packet inspection basically requires a session table which stores source and destination IP addresses and port numbers. It is necessary to perform real-time packet inspection by checking, for each input packet, whether or not a corresponding entry is present in the session table. Real-time packet processing at wire speed should not cause any packet delay or loss even when the number of managed sessions is increased to more than one million.

Previously developed software-based solutions cannot meet these requirements. One software-based technique has attempted to use a distributed system. However, as the number of sessions increases, this technique requires a higher processing speed, thereby causing performance problems. Thus, software-based solutions cannot perform real-time packet inspection ensuring the wire speed.

To overcome these problems, hardware-based solutions have been developed. The performance of stateful packet inspection equipment mainly depends on a process of generating state information through session table processing and a process of inspecting packets using this state information. As many studies have already been conducted on the packet inspection, good solutions such as parallel bloom filters have been developed. However, the state information generation process through session table processing has not been studied enough.

SUMMARY OF THE INVENTION

Therefore, the present invention has been made in view of the above problems, and it is an object of the present invention to provide a session table processing method that allows more efficient generation of state information and to provide a method and apparatus for performing stateful packet inspection in real time through the session table processing method.

In accordance with one aspect of the present invention, the above and other objects can be accomplished by the provision of a stateful packet inspection apparatus comprising a session table that stores session data of a packet received from an external network; a hash key generator that hashes a parameter extracted from the received packet and generates a hash pointer of the session table corresponding to the packet; a session detection module used to search the session table for a session corresponding to the received packet; a session management module that performs management of the session table, the management including addition, deletion, and change of sessions of the session table; and a packet inspection module that generates state information corresponding to the received packet from both directionality information of the packet and entry header information of the packet stored in the session table and then inspects the packet based on the generated state information.

In accordance with another aspect of the present invention, there is provided a digital computing device comprising a communication unit used to receive packets from an external network; a memory unit including a volatile memory and a nonvolatile memory used to store at least one application; a processor that is coupled to the memory and communication units in order to execute the at least one application; and a stateful packet inspection apparatus used to filter an input packet stream, wherein the stateful packet inspection apparatus includes a session table that stores session data of a packet received from an external network; a hash key generator that hashes a parameter extracted from the received packet and generates a hash pointer of the session table corresponding to the packet; a session detection module used to search the session table for a session corresponding to the received packet; a session management module that performs management of the session table, the management including addition, deletion, and change of sessions of the session table; and a packet inspection module that generates state information corresponding to the received packet from both directionality information of the packet and entry header information of the packet stored in the session table and then inspects the packet based on the generated state information.

Although the present invention is originally intended to be implemented in hardware, it can also be implemented in software. In one embodiment, a computer including a processor and a memory operates to execute software used to perform the stateful packet inspection method of the present invention.

In accordance with another aspect of the present invention, there is provided a stateful packet inspection method comprising receiving a packet from an external network; constructing a session table including session data of the received packet using a first hash function to generate indices that point to hash sets in the session table permitting hash collisions and a second hash function to generate hash addresses that are used to identify session entries in a hash set; generating state information of the received packet from both directionality information of the packet and information of the session data of the packet included in the session table; and performing packet inspection of the received packet based on the state information.

In accordance with another aspect of the present invention, there is provided a computer-readable storage medium containing a computer program used to perform a stateful packet inspection method comprising receiving a packet from an external network; constructing a session table including session data of the received packet using a first hash function to generate indices that point to hash sets in the session table permitting hash collisions and a second hash function to generate hash addresses that are used to identify session entries in a hash set; generating state information of the received packet from both directionality information of the packet and information of the session data of the packet included in the session table; and performing packet inspection of the received packet based on the state information.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the accompanying drawings so that the present invention will be easily carried out by those skilled in the art. Reference will be made, purely by way of example, to the accompanying drawings. Wherever possible, the same reference numbers will be used throughout the drawings to refer to the same or like parts.

Figure 1:
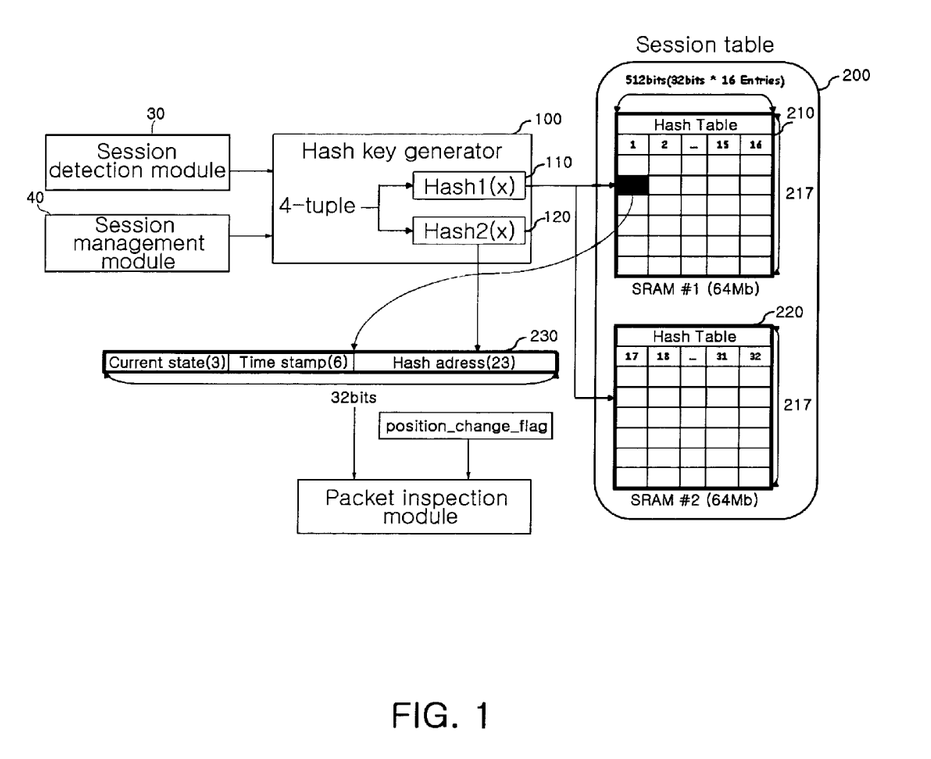
FIG. 1 is a block diagram illustrating a schematic configuration of a stateful packet inspection apparatus, according to a preferred embodiment of the present invention.

FIG. 1 is a block diagram illustrating a schematic configuration of a stateful packet inspection apparatus according to a preferred embodiment of the present invention.

As shown in FIG. 1, the stateful packet inspection apparatus includes a hash key generator 100, a session table 200, a session detection module 30, a session management module 40, and a packet inspection module 50. Although not shown in FIG. 1, the stateful packet inspection apparatus can communicate, through a bus interface, with a communication unit used to receive packets from an external network, a memory unit including a volatile memory and a nonvolatile memory used to store at least one application, and a processor that is coupled to the memory and communication units in order to execute the at least one application.

The session table 200 according to the present invention stores session entries 230 that are indexed and managed by the hash key generator 100.

4-tuple information including a source IP address (Src_ip), a destination IP address (Dst_ip), a source port (Src_port), and a destination port (Dst_port) is input, as information used to hash a newly received packet, to the hash key generator 100. Once the packet is input, a packet parser (not shown) extracts this information from the packet. The hash key generator 100 indexes and manages a session entry corresponding to the received packet based on the input 4-tuple information.

In the present invention, a stateful packet inspection is performed on packets received through an input packet stream. Although the input data stream is exemplified by packets in the description of the present invention for ease of explanation, the input stream applicable to the present invention should be construed to include any type of input data such as frames, packets, bytes, and PDUs according to applications.

As shown in FIG. 1, a preferred embodiment of the hash key generator 100 applicable to the present invention has a dual hash structure with two different hash functions Hash1(x) 110 and Hash2(x) 120. The hash functions Hash1(x) and Hash2(x) are functions known in the art that are used to hash packets. For example, XOR or CRC functions can be used as the hash functions according to selection of those skilled in the art. One of the two hash functions "Hash1(x)" is used to generate indices that point to hash sets permitting hash collisions in order to achieve faster session table search. The other hash function "Hash2(x)" is used to generate hash addresses that are used to identify session entries in a hash set pointed by the hash function "Hash1(x)". A preferable session table applicable to the present invention may be implemented using two or more SRAM devices. The session table 200 is constructed using two SRAMs (SRAM#1 and SRAM#2) 210 and 220, which can be accessed simultaneously or in parallel using a hash set index that is generated by the Hash1(x) to achieve faster session table search.

The session table 200 stores session data of packets input from an external network. A preferred embodiment of the session table 200 applicable to the present invention has an N-way set associative session table structure in which each hash set in the session table can include N session entries. The session table 200 shown in FIG. 1 is a 32-way associative session table that is constructed using two 64-Megabit SRAMs with each session entry having a length of 32 bits. This session table structure is only an example and other structures can be optionally used.

Each session entry 230 stored in the session table includes current state, time stamp, and hash address parts. The current state part includes current connection state information of a corresponding session, the time stamp part is used to determine which session entry is to be deleted when the session table is full, and the hash address part is used to identify each session entry in the same hash set. The time stamp is updated by an internal timer each time a corresponding session is accessed. If all hash sets of the session table are full so that any new session cannot be assigned to the hash sets, time of the current timer is compared with the time stamp of each session entry to replace the oldest session with a new session. For example, a Least Recently Used (LRU) algorithm is applied to this process. Once a Transmission Control Protocol (TCP) session is terminated without sending an RST or FIN packet, a corresponding session entry is immediately removed if a time stamp in the session entry exceeds a timeout threshold predetermined by the administrator. Accordingly, a session which has been terminated without sending an RST or FIN packet is positively removed from the session table.

When the session table 200 is full, the probability that each session is brought into a full-out state is very important in a session table management method because wrong state information is generated if any existing session, which has not yet been terminated, is replaced with a new session as all the hash sets are full. Distribution of the number of sessions assigned to each hash set in the session table follows a normal distribution as expressed by Equation 1.

$$f(x) = \frac{1}{\sqrt{2\pi}} \exp\left(-\frac{1}{2\sigma^2}(x-\mu)^2\right) \quad \text{[Equation 1]}$$

This is standardized using Equations 2 and 3 and then the full-out probability of each session in the 32-way set associative session table is calculated to obtain P{X>32}=P{Z>8.3}. This indicates a sigma of 8.3 which is nearly 0%.

$$Z = \frac{X-\mu}{\sigma} \quad \text{[Equation 2]}$$

$$P(a < X < b) = P\left(\frac{a-\mu}{\sigma} < Z < \frac{a-\mu}{\sigma}\right) \quad \text{[Equation 3]}$$

The session detection module 30 searches the session table 200 according to the received packet. Specifically, the session detection module 30 obtains a hash pointer calculated by the hash key generator 100 to calculate a hash value associated with a detected session and then searches the session table 200 for a session entry corresponding to the hash pointer.

The session management module 40 performs a process for adding, deleting, and changing sessions of the session table 200 in order to maintain the session table 200. To accomplish this, the session management module 40 searches for a session entry using the hash key generator 100 in the same manner as the session detection module 30 and inserts the received packet in the session table 200 or removes a stored session from the session table 200.

The packet inspection module 50 generates state information corresponding to the received packet from both information regarding the directionality of the packet and header information 230 of an entry corresponding to the packet and then inspects the received packet based on the generated state information.

Figure 2:
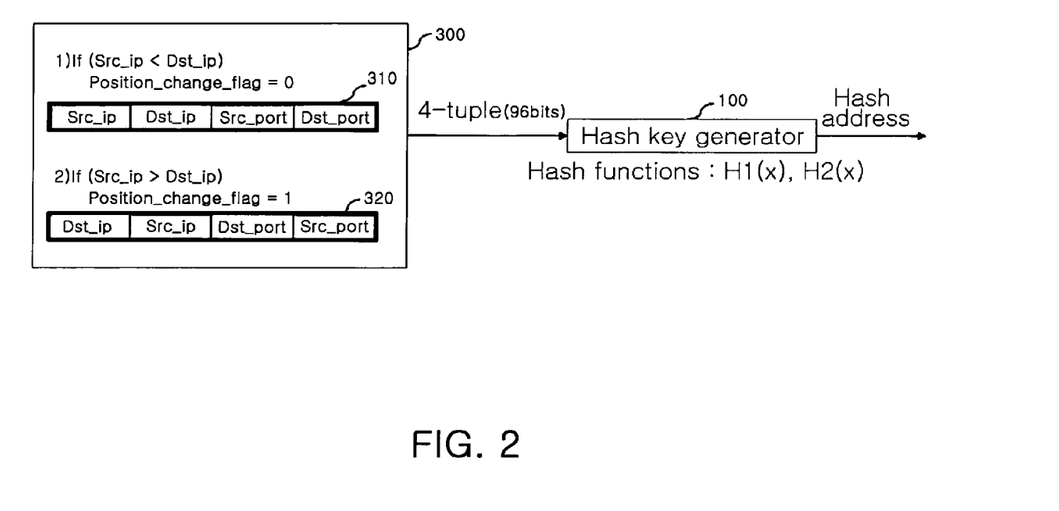
FIG. 2 schematically illustrates a method for processing directionality information included in each packet, which indicates the directionality of the packet in a corresponding session, in a hash key generator according to another embodiment of the present invention.

FIG. 2 schematically illustrates a method for processing directionality information included in each packet, which indicates the directionality of the packet in a corresponding session, in the hash key generator 100 according to another embodiment of the present invention. Each packet transmitted over the network includes information regarding the directionality of the packet in a corresponding session, which indicates whether the directionality of the packet is from the client to the server or from the server to the client. This information is very useful in a network intrusion detection or prevention system. However, the directionality information may cause a significant confusion in searching for a corresponding session in the session table since the hash address of each packet belonging to the same session may vary depending on the directionality. To prevent the hash address from varying depending on the directionality, the hash key generator 100 according to the embodiment of the present invention compares the value of a source IP address with the value of a destination IP address and modifies a corresponding 4-tuple value so that one of the source and destination addresses, which has the lower value, always precedes the other with the higher value. A specific flag is defined to indicate whether or not such a position change has been made. For example, a flag "Position_change_flag" is defined, which is assigned "1" when the position change has been made and "0" when no position change has been made. The Position_change_flag information is very efficiently used in generating state information together with current state information.

Figure 3:
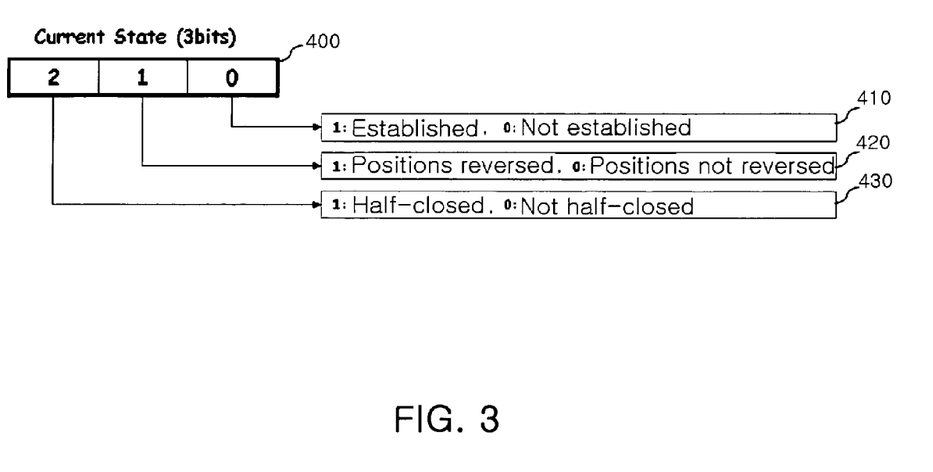
FIG. 3 illustrates information stored in a current state part in each session entry.

FIG. 3 illustrates information stored in a current state part in each session entry. A preferred embodiment of the current state part applicable to the present invention has 3 bits in a 32-bit session entry.

The first bit of the current state part contains session connection establishment information. For example, when a session connection has been established between the client and the server, the first bit is set to "1" and, when no session connection has been established between the client and the server, the first bit is set to "0". However, the present invention is not limited to this bit value setting and the first bit can be set to the opposite value according to selection of those skilled in the art.

The second bit of the current state part contains information indicating whether or not the source and the destination were reversed when the session was registered in the session table. This information is different from the information contained in the flag "Position_change_flag" shown in FIG. 2. The difference between the information contained in the second bit and the information contained in the flag "Position_change_flag" are described below in detail with reference to FIG. 6.

The third bit of the current state part contains information indicating whether or not the connection is in a half-closed state. Each session is terminated only when the second FIN packet is received when the connection of the session is in a half-closed state. In the example of FIG. 3, when the connection is in a half-closed state, the third bit is set to "1" and, when the connection is not in a half-closed state, the third bit is set to "0". However, the present invention is not limited to this bit value setting and the third bit can be set to values opposite to those shown in FIG. 3.

Figure 4:
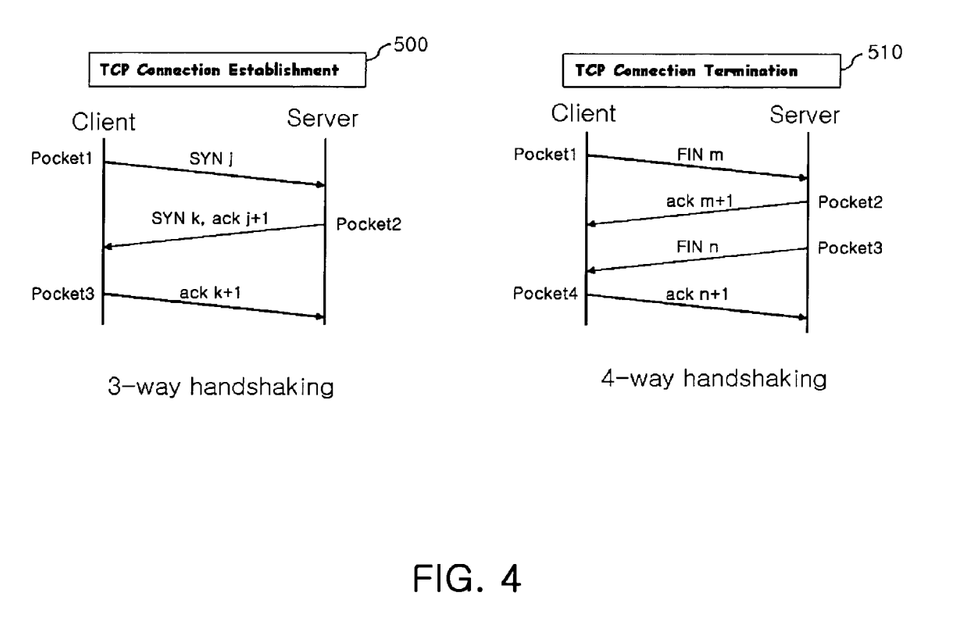
FIG. 4 is a signal flow diagram schematically illustrating general processes for establishing and terminating a TCP connection between a client and a server.

FIG. 4 is a signal flow diagram schematically illustrating general processes for establishing and terminating a TCP connection between a client and a server.

The TCP connection establishment process 500 is performed through 3-way handshake. When the client sends a SYN packet to the server to request it to establish a new connection, the server responds with a SYN/ACK packet and then the client sends an ACK packet to the server in response to the SYN/ACK packet, thereby completing the establishment of the connection.

The TCP connection termination process 510 is performed through an RST packet or an FIN packet. The FIN packet is transmitted through 4-way handshake. If one of the client and the server sends an FIN packet, then the other sends an ACK packet in response to the FIN packet. This state in which the first packet has been received is referred to as a "half-closed state". If the client transmits a second FIN packet in the half-closed state, then the server transmits a second ACK packet in response to the second FIN packet, thereby terminating the TCP session.

Figure 5A:
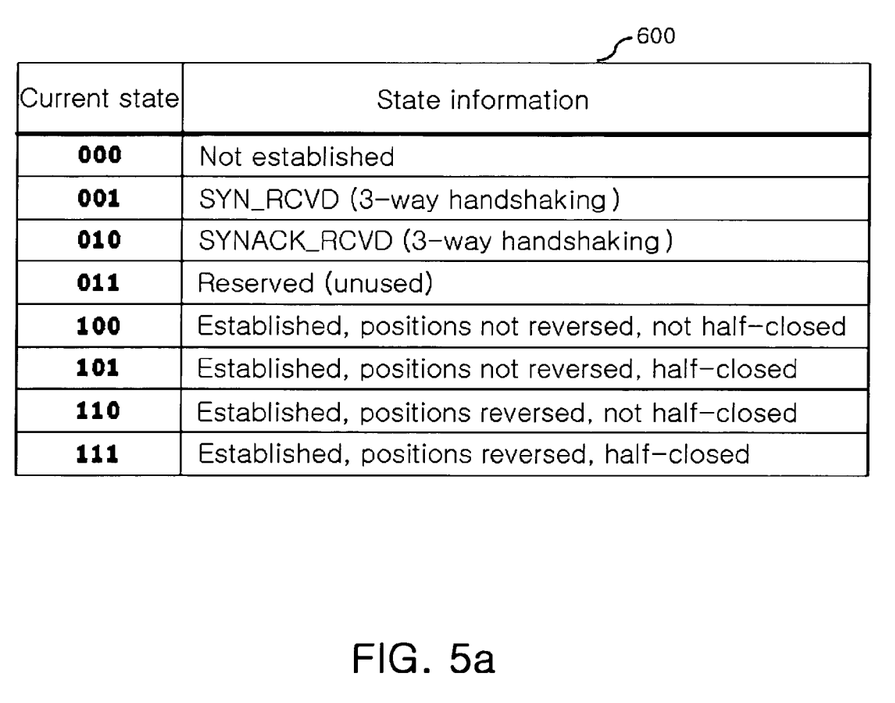
FIG. 5A is a table showing the relationship between current state information (3-bit values) stored in the current state part of each session entry and states indicated by the 3-bit values.
Figure 5B:
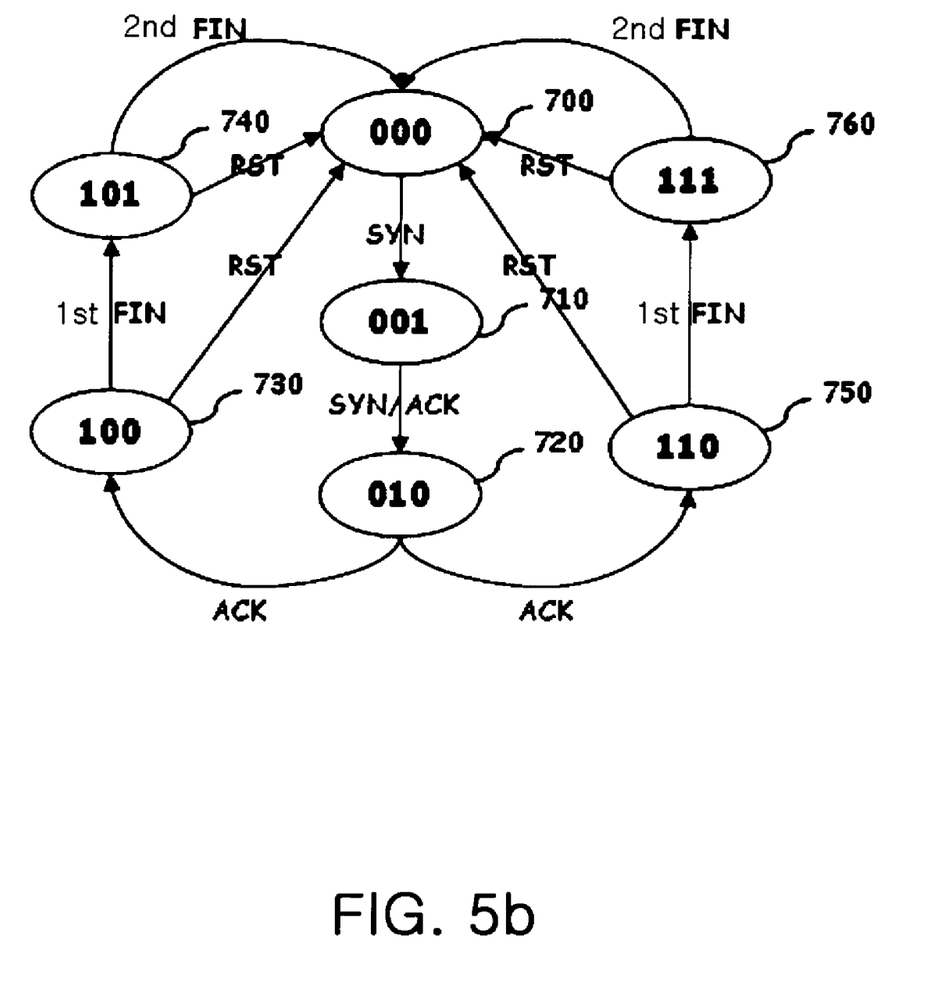
FIG. 5B is a state transition diagram showing the relationship between the 3-bit values stored in the current state part of FIG. 5A and states of input packets.

FIG. 5A is a table showing the relationship between current state information (3-bit values) stored in the current state part of each session entry and states indicated by the 3-bit values, and FIG. 5B is a state transition diagram showing the relationship between the 3-bit values stored in the current state part of FIG. 5A and states of input packets.

The current state value is "000" in an initial state where no session has been established between the client and the server. If the client transmits a SYN packet to the server to establish a TCP session as shown in FIG. 3, the current state value transitions to "001". Thereafter, if a SYN/ACK packet is transmitted, the current state value transitions to "010".

If the last ACK packet is transmitted in the state of "010" in the 3-way TCP handshake process for establishing a TCP connection, the value of the source is compared with the value of the destination and the current state value transitions to "110" if it is determined, based on the comparison, that the position change has been made and the current state value transitions to "100" if no position change has been made. If the first FIN packet for terminating the TCP connection is transmitted in the "110" state, the current state value transitions to "111". Thereafter, if the second FIN packet is transmitted in the "111" state, the current state value transitions to the initial state value "000". If the first FIN packet is transmitted in the "100" state, the current state value transitions to "101". Thereafter, if the second FIN packet is transmitted in the "101" state, the current state value transitions to the initial state value "000". That is, if an RST packet for terminating the TCP connection is transmitted in any one of the "110", "100", "101", and "111" states, the current state value transitions to the initial state value "000".

Figure 6:
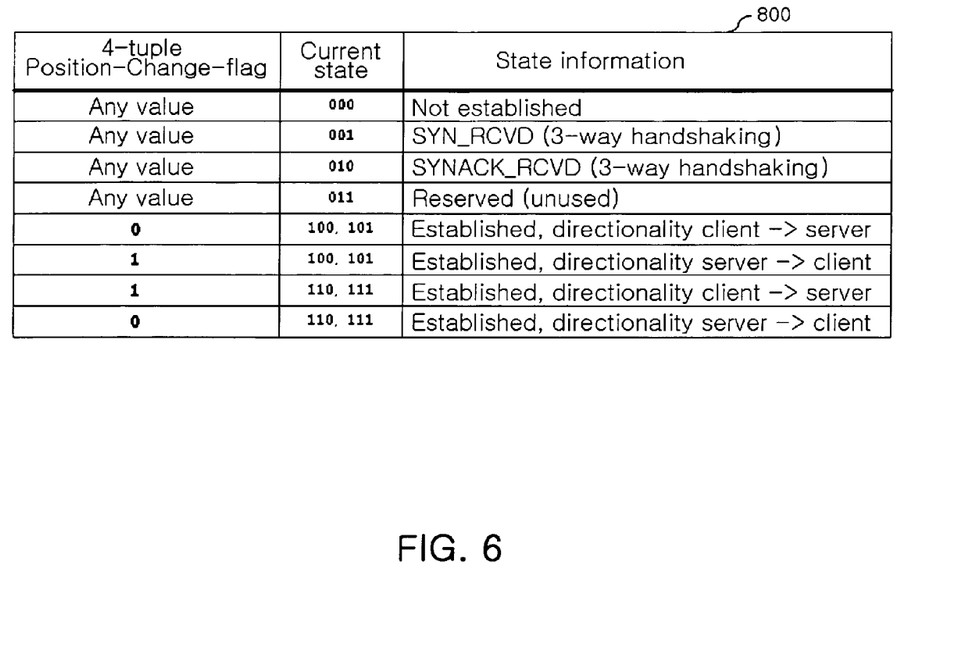
FIG. 6 illustrates a process for generating state information from a "Position_change_flag" value and a current state value stored in the current state part.

FIG. 6 illustrates a process for generating state information from a "Position_change_flag" value and a current state value stored in the current state part.

The state information is generated basically using the current state value and the directionality of each packet is determined from a combination of the current state value and the "Position_change_flag" value. For example, if the current state value is "100" or "101" while the "Position_change_flag" value is "0", the directionality of the current packet included in the state information is from the client to the server since the source and destination of the current packet have not been reversed and the source and destination had not been reversed (i.e., the directionality was from the client to the server) when the corresponding session was registered. On the other hand, if the current state value is "100" or "101" while the "Position_change_flag" value is "1", the directionality of the current packet included in the state information is from the server to the client since the source and destination of the current packet have been reversed and the source and destination had not been reversed (i.e., the directionality was from the client to the server) when the corresponding session was registered.

Figure 7:
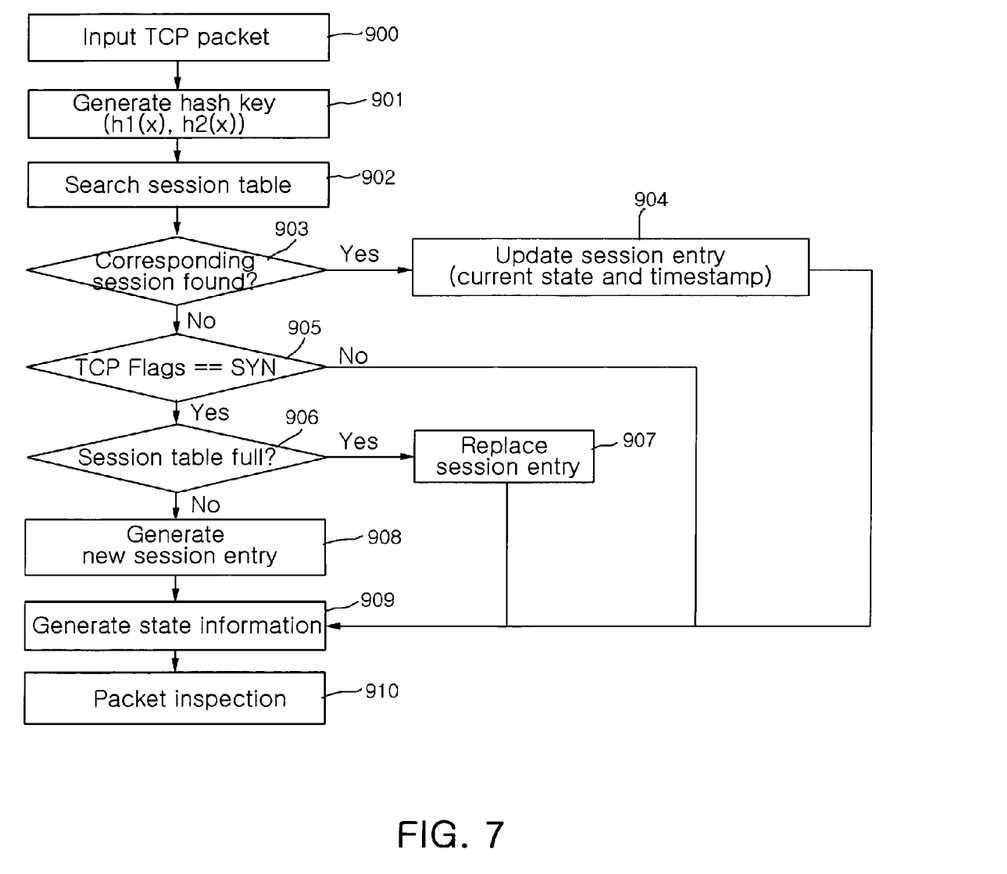
FIG. 7 is a flow chart schematically illustrating a procedure for processing a packet according to another embodiment of the present invention.

FIG. 7 is a flow chart schematically illustrating a procedure for processing a packet according to another embodiment of the present invention.

First, when a packet is input, a hash key value is generated using 4-tuple information extracted from the packet (901) and a session table is searched for a corresponding session using the generated hash key value (902).

If the corresponding session is found in the session table, its session entry information is updated (904). If the corresponding session is not found in the session table, a new session is generated only when the current packet is a SYN packet (905). If the session table, for which a new session is to be generated, is full (906), the oldest session entry is selected using the LRU algorithm and it is then replaced with the new session (907). If the session table is not full, a new session is generated for the session table (908).

Once the session table for the received packet is constructed as described above, state information of the packet is generated (909). It is preferable that the method illustrated in FIGS. 5A and 5B be used to generate the state information of the packet.

Then, inspection of the packet is performed based on the generated state information (910) The state information is useful information to be referred to when performing the packet inspection. The state information is used for packet filtering in a firewall and is used for more accurate packet inspection in a network intrusion detection or prevention system. The term "stateful packet inspection" is used in the description of the present invention since the state information is referred to when performing the packet inspection.

As is apparent from the above description, the present invention provides a stateful packet inspection method and apparatus which can perform stateful packet inspection in real time by performing session table processing that allows more efficient generation of state information.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A stateful packet inspection apparatus comprising:
   a processor and a memory, the memory having stored thereon:
   a session table that stores session data of a packet received from an external network;
   a hash key generator that hashes a parameter extracted from the received packet and generates a hash pointer of the session table corresponding to the packet, wherein each session entry of the table includes a position change flag so that one of a source and destination addresses, which has a lower value, always precedes the other with the higher value;
   a session detection module used to search the session table for a session corresponding to the received packet;
   a session management module that performs management of the session table, the management including addition, deletion, and change of sessions of the session table; and
   a packet inspection module that generates state information corresponding to the received packet from both directionality information of the packet and entry header information of the packet stored in the session table and then inspects the packet based on the generated state information.

2. The stateful packet inspection apparatus according to claim 1, wherein the session table has an N-way set associative session table structure in which each hash set can include N session entries.

3. The stateful packet inspection apparatus according to claim 1, wherein the session table has a 32-way set associative session table structure in which each hash set can include 32 session entries.

4. The stateful packet inspection apparatus according to claim 1, wherein the session table is implemented using at least two SRAM devices.

5. The stateful packet inspection apparatus according to claim 1, wherein the hash key generator uses a first hash function to generate indices that point to hash sets in the session table permitting hash collisions and a second hash function to generate hash addresses that are used to identify session entries in a hash set.

6. The stateful packet inspection apparatus according to claim 5, wherein the hash key generator uses information of a source IP address, a destination IP address, a source port, and a destination port extracted from the received packet to generate a hash key.

7. The stateful packet inspection apparatus according to claim 6, wherein, when positions of the source IP address and the destination IP address have been set such that one of the source and destination IP addresses, which has a lower value, precedes the other by comparing values of the source and destination IP addresses, the directionality information of the received packet used by the packet inspection module has different values depending on whether or not the positions of the source IP address and the destination IP address have been reversed.

8. The stateful packet inspection apparatus according to claim 1, wherein the session management module removes sessions not in use from the session table.

9. The stateful packet inspection apparatus according to claim 1, wherein the session management module removes a session when a time stamp associated with the session exceeds a predetermined threshold.

10. The stateful packet inspection apparatus according to claim 1, wherein each session entry stored in the session table includes:
   a current state part including connection state information of a corresponding session;
   a time stamp part used to determine which session entry is to be deleted when the session table is full; and
   an address part used to identify each session entry in the same hash set.

11. The stateful packet inspection apparatus according to claim 10, wherein the current state part includes:
   a first information element indicating whether or not a session connection has been established between a client and a server;
   a second information element indicating whether or not a source and a destination were reversed when a corresponding session was registered in the session table; and
   a third information element indicating whether or not the session connection is in a half-closed state.

12. A digital computing device comprising:
   a communication unit used to receive packets from an external network;
   a memory unit including a volatile memory and a nonvolatile memory used to store at least one application;
   a processor that is coupled to the memory and communication units in order to execute the at least one application; and
   a stateful packet inspection apparatus used to filter an input packet stream received through the communication unit, wherein the stateful packet inspection apparatus includes:
   a session table that stores session data of a received packet;
   a hash key generator that hashes a parameter extracted from the received packet and generates a hash pointer of the session table corresponding to the packet, wherein each session entry of the table includes a position change flag so that one of a source and destination addresses, which has a lower value, always precedes the other with the higher value;
   a session detection module used to search the session table for a session corresponding to the received packet;
   a session management module that performs management of the session table, the management including addition, deletion, and change of sessions of the session table; and
   a packet inspection module that generates state information corresponding to the received packet from both directionality information of the packet and entry header information of the packet stored in the session table and then inspects the packet based on the generated state information.

13. A stateful packet inspection method comprising:
   configuring a processor to perform the functions of:
   receiving a packet from an external network;
   constructing a session table including session data of the received packet by hashing a parameter extracted from the received packet and generates a hash pointer of the session table corresponding to the packet, wherein each session entry of the table includes a position change flag so that one of a source and destination addresses, which has a lower value, always precedes the other with the higher value;
   generating state information of the received packet from both directionality information of the packet and information of the session data of the packet included in the session table; and
   performing packet inspection of the received packet based on the state information.

14. The stateful packet inspection method according to claim 13, wherein the session table is constructed to have an N-way set associative session table structure in which each hash set can include N session entries.

15. The stateful packet inspection method according to claim 13, wherein the session table is constructed to have a 32-way set associative session table structure in which each hash set can include 32 session entries.

16. The stateful packet inspection method according to claim 13, wherein the session table is constructed using at least two SRAM devices and the at least two SRAM devices are accessed in parallel.

17. The stateful packet inspection method according to claim 13, wherein constructing the session table including the session data of the received packet includes:
   calculating a hash value from the received packet and obtaining a hash pointer corresponding to the received packet; and
   searching for the session entry in the session table according to the hash pointer.

18. The stateful packet inspection method according to claim 17, wherein the hash value is calculated using a first hash function to generate indices that point to hash sets in the session table permitting hash collisions and a second hash function to generate hash addresses that are used to identify session entries in a hash set.

19. The stateful packet inspection method according to claim 17, wherein the hash value is calculated using information of a source IP address, a destination IP address, a source port, and a destination port extracted from the received packet.

20. The stateful packet inspection method according to claim 19, wherein, when positions of the source IP address and the destination IP address have been set such that one of the source and destination IP addresses, which has a lower value, precedes the other by comparing values of the source and destination IP addresses, the directionality information of the received packet used to generate the state information of the received packet is information indicating whether or not the positions of the source IP address and the destination IP address have been reversed.

21. The stateful packet inspection method according to claim 13, wherein constructing the session table includes removing sessions not in use from the session table.

22. The stateful packet inspection method according to claim 13, wherein constructing the session table includes removing a session when a time stamp associated with the session exceeds a predetermined threshold.

23. The stateful packet inspection method according to claim 13, wherein the session data information of the packet included in the session table and used to generate the state information of the packet includes:
   current state information including connection state information of a corresponding session;

time stamp information used to determine which session entry is to be deleted when the session table is full; and address information used to identify each session entry in the same hash set.

24. The stateful packet inspection method according to claim 23, wherein the current state information includes:

first information indicating whether or not a session connection has been established between a client and a server, second information indicating whether or not a source and a destination were reversed when a corresponding session was registered in the session table; and third information indicating whether or not the session connection is in a half-closed state.

25. A computer-readable storage medium containing a computer program for implementing a stateful packet inspection, when executed upon by a processor, to perform the functions of:

receiving a packet from an external network;

constructing a session table including session data of the received packet using a first hash function to generate indices that point to hash sets in the session table permitting hash collisions and a second hash function to generate hash addresses that are used to identify session entries in a hash set, wherein each session entry of the table includes a position change flag so that one of a source and destination addresses, which has a lower value, always precedes the other with the higher value;

generating state information of the received packet from both directionality information of the packet and information of the session data of the packet included in the session table; and performing packet inspection of the received packet based on the state information.

* * * * *